R. VARLEY.

ELECTRICAL SYSTEM FOR AUTOVEHICLES.

APPLICATION FILED NOV. 8, 1916.

Reissued Jan. 23, 1917.

14,252.

4 SHEETS—SHEET 1.

Inventor:
Richard Varley
by W. Arthur Keller
his attorney

R. VARLEY.

ELECTRICAL SYSTEM FOR AUTOVEHICLES.

APPLICATION FILED NOV. 8, 1916.

Reissued Jan. 23, 1917. 14,252.

4 SHEETS—SHEET 2.

Inventor:
Richard Varley
by M. Arthur Keller
his attorney

R. VARLEY.

ELECTRICAL SYSTEM FOR AUTOVEHICLES.

APPLICATION FILED NOV. 8, 1916.

Reissued Jan. 23, 1917.

14,252.

4 SHEETS—SHEET 3.

Inventor:
Richard Varley
by M. Arthur Kelly
his attorney

R. VARLEY.

ELECTRICAL SYSTEM FOR AUTOVEHICLES.

APPLICATION FILED NOV. 8, 1916.

Reissued Jan. 23, 1917. 14,252.

4 SHEETS—SHEET 4.

*Inventor:*
Richard Varley
by M. Arthur Kellie
his attorney

UNITED STATES PATENT OFFICE.

RICHARD VARLEY, OF ENGLEWOOD, NEW JERSEY, ASSIGNOR TO VARLEY DUPLEX MAGNET COMPANY, OF JERSEY CITY, NEW JERSEY, A CORPORATION OF NEW JERSEY.

ELECTRICAL SYSTEM FOR AUTOVEHICLES.

14,252. Specification of Reissued Letters Patent. Reissued Jan. 23, 1917.

Original No. 1,185,151, dated May 30, 1916, Serial No. 704,259, filed June 17, 1912. Application for reissue filed November 8, 1913. Serial No. 130,296.

*To all whom it may concern:*

Be it known that I, RICHARD VARLEY, a citizen of the United States of America, residing at Englewood, in the county of Bergen and State of New Jersey, have invented new and useful Improvements in Electrical Systems for Autovehicles, of which the following is a full, clear, and exact description, reference being had to the accompanying drawings, which form part of this specification.

This invention relates to electrical systems and has particular reference to the equipment of autovehicles, such as automobiles, motor boats, etc. Its object is the provision of a combined system of lighting and ignition whereby the vehicle and attachments used thereon may be illuminated and the combustible charges in the cylinders of the propelling engine may be exploded.

I will now describe my invention, referring to the accompanying drawings, so that others skilled in the art to which it appertains may understand and construct the same. However, the apparatus and arrangement of electrical circuits shown may be varied without departing from my invention, and I do not therefore desire to limit myself to the embodiment which I have selected to illustrate my invention.

Figure 1:
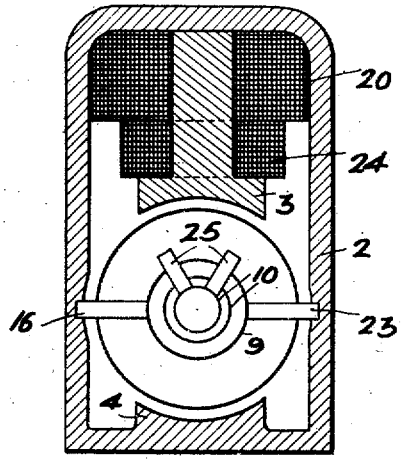
Figure 2:
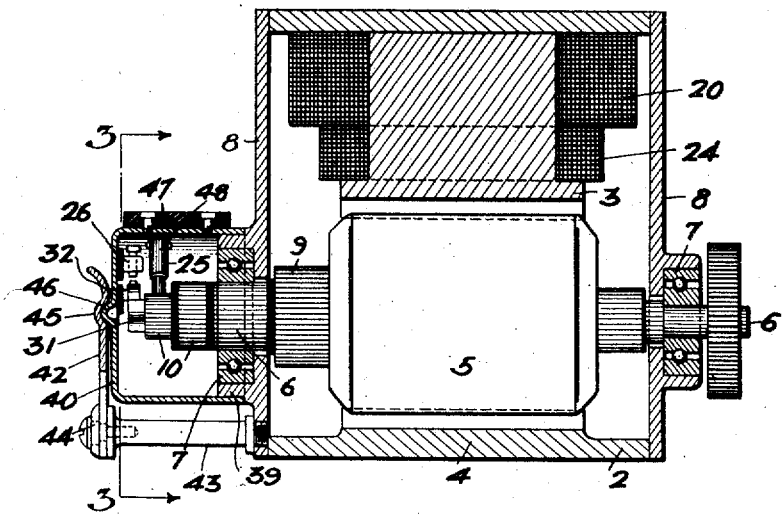
Figure 3:
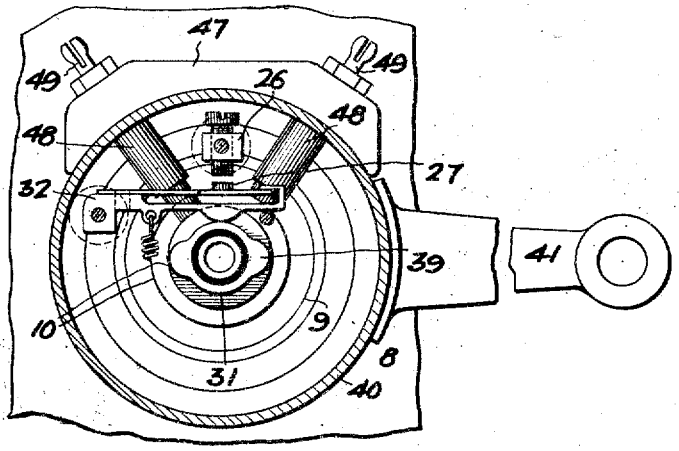
Figure 4:
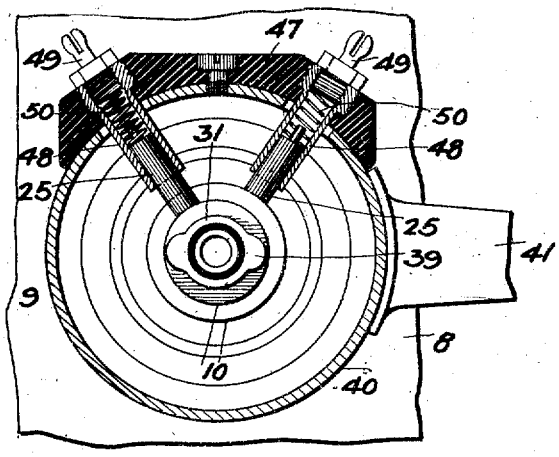
Figure 5:
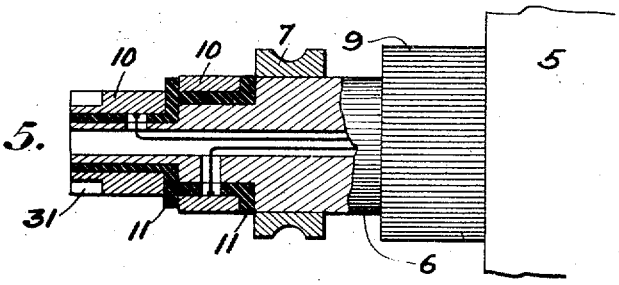
Figure 6:
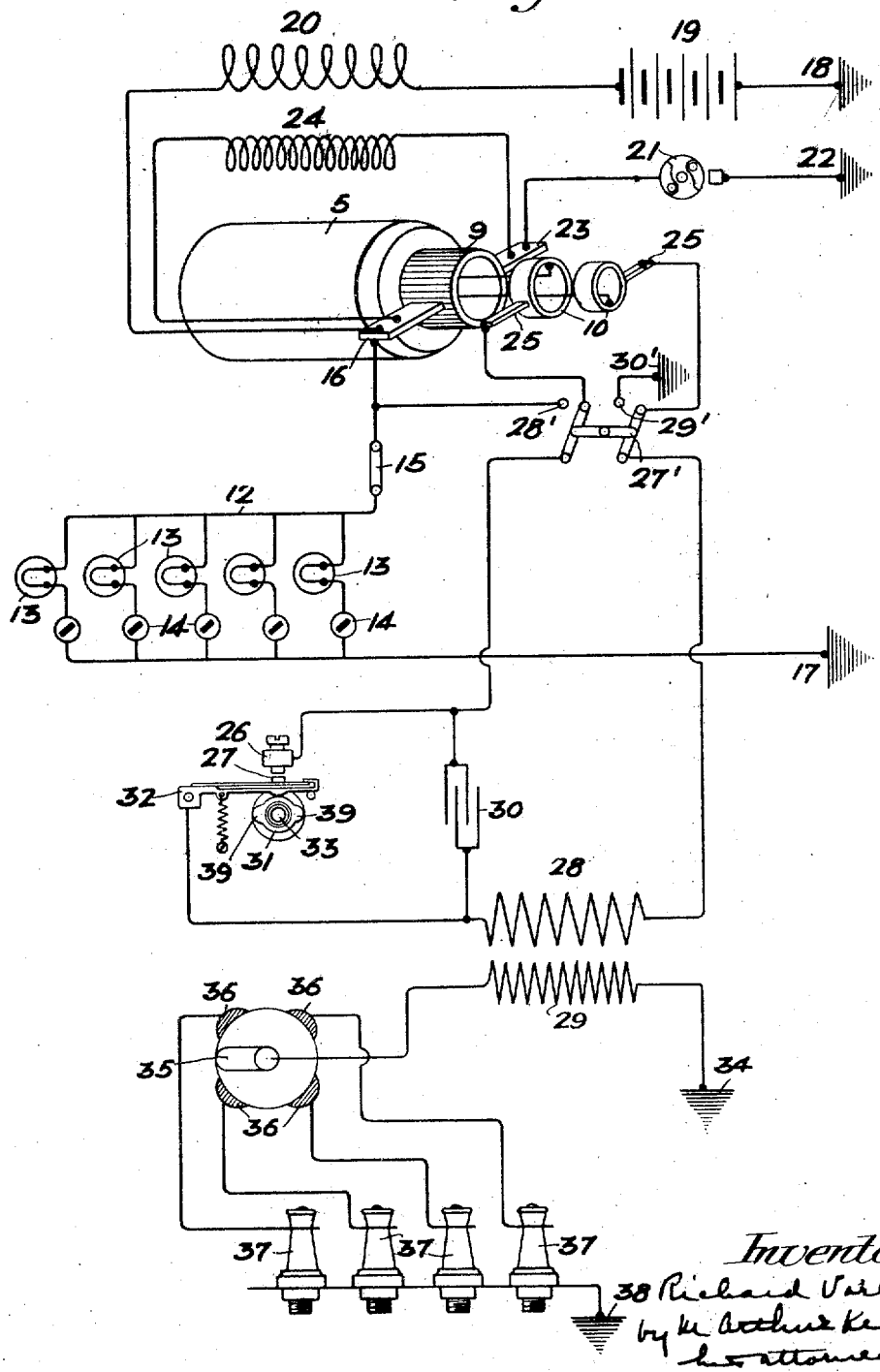
Figure 7:
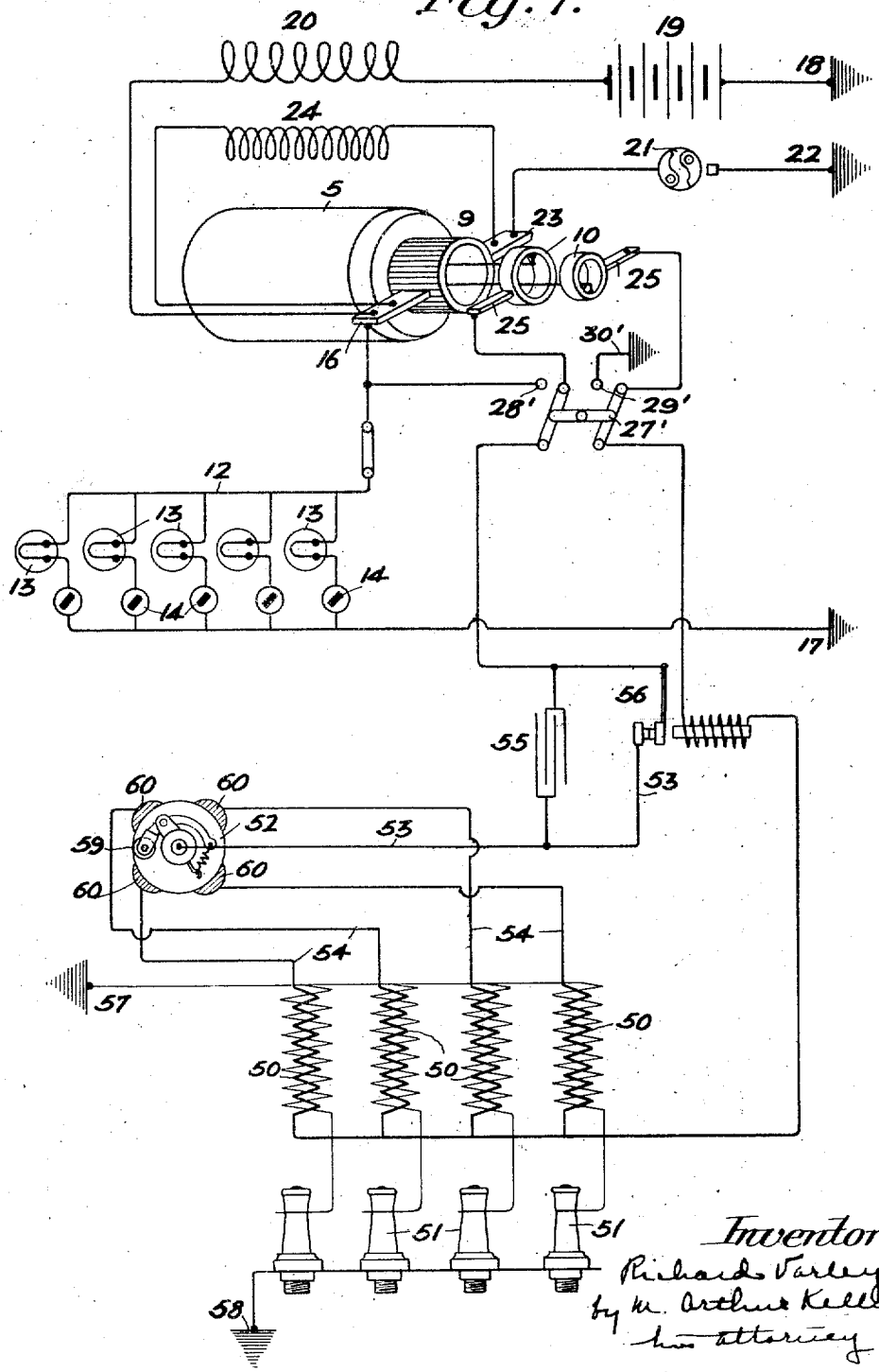

Figure 1 is a vertical longitudinal sectional view of apparatus which may be employed in my system; Fig. 2 is a transverse section of the same; Fig. 3 is an enlarged section on the line 3—3 of Fig. 2; Fig. 4 is a similar view but omitting the contact pieces of the ignition circuit; Fig. 5 is an enlarged sectional view of the armature shaft, showing the commutator and collector rings mounted thereon; Fig. 6 is a diagrammatic view of the preferred form or arrangement of circuits; and Fig. 7 is a similar view showing a modified form of circuits to be hereinafter more fully described.

In Figs. 1 to 5 inclusive I show a form of generator in the construction of which is employed a dual or duplex armature from which is taken both direct and alternating current. The frame 2 of this generator is substantially shell-like in construction and carries the depending pole piece 3 diametrically disposed from the shallow upwardly extending pole piece 4 carried by the base of the frame. These poles form between them the magnetic field chamber for the armature 5, the shaft 6 of which is journaled in suitable bearings 7 in the end walls or plates 8 of the generator frame. This armature may be directly driven by the propelling engine of the vehicle through any suitable connection. The commutator of the armature, from which direct current is taken from the armature winding, is indicated by the numeral 9, while the numeral 10 indicates the collector rings from which alternating current is taken from the said armature winding at certain points in the current wave, as will be hereinafter more fully described. As shown in Fig. 5 the commutator 9 and collector rings 10 are preferably carried by the armature shaft 6, being insulated therefrom by suitable insulation 11. The collector rings are preferably so disposed on the shaft as to be positioned outside of the casing where they are readily accessible for connection with the ignition apparatus, as hereinafter described, and for cleaning and adjustment of associated apparatus and are also of such diameter that the shaft may be readily slipped into or removed from the bearings of the generator frame without the necessity of dismantling or removing the rings therefrom.

Referring for the present to the diagram in Fig. 6 a general work circuit or lighting circuit is indicated by the numeral 12 in which circuit are indicated lamps 13 preferably in parallel therein, which may be controlled individually by switches 14 or collectively by a switch 15. This lamp circuit extends from brush 16 of the commutator to ground 17 then to ground 18, battery 19 and winding 20 to the brush 16, when a switch 21 is open between ground connection 22 and the opposite brush 23 of the commutator. The switch 21 is preferably of the centrifugally operated type (such as described in my application for Letters Patent Serial No. 704,258) if the circuit is not equipped with a magnetic cut out, so as to prevent the battery current from backing up or discharging through the generator at low speed or low potential output. When this switch 21 is closed (as when the speed of the generator reaches a determined amount or, if it be an electrically operated one, when the voltage reaches a certain degree) the lamp circuit is completed from the brush 16 to ground at 17, then from ground 22 and switch 21 to the brush 23.

Upon the pole piece is a field winding 24 which, as indicated in Fig. 6, is in shunt across the brushes 16 and 23. The other field winding 20 also preferably disposed upon the pole piece 3, is, as above indicated, connected to the brush 16 and is in circuit with the battery or accumulator 19. The arrangement of the windings 20 and 24 upon the pole piece 3 is such that when the switch 21 is closed and the voltage of the armature 5 is less than that of the battery the current from the battery flows through both windings in such directions that the magneto forces of the windings or coils 20 and 24 are added to one another to magnetize the field of the armature 5. As the armature 5 increases in speed and its voltage exceeds that of the battery the current in the winding 20 will be reversed or will travel in such direction that its magnetomotive force opposes that of the winding 24 and thereby decreases the magnetism in the field pieces 3 and 4, serving to restrain the rise in voltage and resulting in minimization or obviation of variations in the voltage of the light circuit. To assist in this control I may form extended air gaps between the poles and the armature so as to facilitate leakage in the field by this interposed magnetic reluctance. From this same armature 5 through the medium of collector rings 10 and collector brushes 25 I take certain portions of the generated current, as hereinafter described, utilizing the following preferred circuit leading from the brushes 25 to a fixed contact 26 and movable contact 27. This circuit may comprise a primary circuit of ignition apparatus. Included in the primary circuit I indicate a primary coil 28 which may form part of suitable ignition or spark producing apparatus, being in inductive relationship to a secondary coil 29 of such sparking mechanism. Connected across the primary circuit I show the usual condenser 30. At 31 is indicated a contact and interrupter cam adapted to oscillate the lever 32 which carries the contact 27. This cam plate 31 is insulated from the rotary operative support or mounting 33 which, as hereinafter described, may form part of the armature shaft, to prevent short circuiting of current and interference with the light or work circuit above described. The secondary coil is shown as leading to ground 34 while the opposite end is connected to a distributer arm 35 which is adapted to rotate, as by being geared to the engine or generator, to successively contact with segments 36 which connect with spark plugs 37 which in turn are grounded, as through the cylinders of the engine, at 38. This distributer mechanism is preferably mounted on the engine or some other convenient part of the equipment and properly geared or timed, as hereinafter set forth, instead of being directly carried by the generator frame, the idea being to keep the generator mechanism extremely compact. Of course I do not desire to be restricted thereto, as it may be mounted and directly geared to the armature of the generator, if desired. It will be apparent that other forms of ignition mechanism may be employed in association with the alternating current circuit as will be hereinafter set forth, and although I describe the secondary coil as having a live connection at only one end thereof this arrangement may be altered, as, for instance, connecting, instead of grounding, the other end of the coil to another set of spark plugs, bringing them in series with the first set. The interrupter plate 31 carries the symmetrically disposed projections 39, and this plate is preferably so geared and the projections 39 so disposed thereon as to effect a closing of the contacts 26 and 27 at periods coincident with the compression strokes of the engine and the high points of the alternating current wave generated in the armature 5. The distributer arm 35 is also geared in synchronism with the engine so that the said distributer arm contacts with a segment 36 when the primary coil is charged and discharged. Thus, as is well understood in the art, with the charging of the primary coil through closing of the primary circuit and resultant charging and discharging of the condenser a very high potential current is generated in the secondary winding 29 as the distributer arm closes the circuit through a spark plug, resulting in the production of high potential sparks at the plugs for the purpose of exploding the combustible charges in the cylinders.

The establishing of the primary alternating or ignition circuit, as stated above, preferably takes place only at or near those points in the current wave when it approaches or reaches its peak of highest point of flow, and such contact is broken when the wave starts to decrease or fall to zero from this period. It will thus be seen that the character of the current utilized in the circuit is alternating, the current rising to its highest value and charging the primary in one direction after which it is broken and then the circuit again closed so that it rises in the opposite direction and is again interrupted; the current rising twice to its maximum in each revolution of the armature. By the employment of a large ordinary drum or similar direct current wound armature, incident to its work circuit or light circuit use, I obtain a proportionately large true sine curve characteristic of which is the broad or long sustained peak or maximum period of flow, as contra-distinguished from the narrow and contracted peak of the wave produced by an ordinary ignition magneto.

The maintenance of a high flux potential combined with the enlarged continuous periphery of the armature operates for full flux action and gradual current assumption or rise to this maximum period. This gives a peak formation peculiarly adaptable for utilization in energizing the ignition apparatus for it enables a longer contact dwell with resultant increased spark efficiency.

It is well understood that under normal conditions, that is, when there is no pronounced reactance in the circuit, the generation of alternating current has magnetizing and demagnetizing influence on the magnet field, which tendencies are equal and which therefore do not alter or disturb the field density. Realizing these facts I maintain a high field density and utilize the current wave alternately for ignition purposes preferably only at or near such times, as above stated, when it attains its highest value, so that I do not sensibly affect the field density at this time and therefore do not interfere with or create an appreciable disturbance in the work or light circuit, which by reason of this high field density is uninterruptedly energized without utilizing for that purpose the maximum peak of the wave. Therefore, with the field controlled by the duplex winding and other agencies above described, there is insured not only substantial constancy of voltage in the light circuit but also a high potential voltage in the ignition circuit. The primary circuit is also shown with a double arm switch 27′ by means of which the ignition apparatus may be initially energized from the battery to explode the first combustible mixtures in the cylinders when starting the engine and before the generator delivers current sufficient for that purpose, said battery connections being made through terminal contacts 28′ and 29′, the contact 28′ being associated with the winding 20 and the contact 29′ grounded at 30′.

In Figs. 2, 3, 4 and 5 I indicate a desirable manner of mounting the collector brushes, ignition contacts, etc. The front plate 8 of the armature frame is provided with an annular shoulder or seat 39 concentric with the armature shaft. Fitting on the shoulder is a cap piece or casing 40 mounted in the interior of which and insulated therefrom is the contact lever 32 and fixed contact 26. The interrupter plate or cam 31 is shown as fixedly carried by the armature shaft and, as shown in Fig. 5, may be formed integral with the outer collector ring 10 which connects with the contact lever 32. The casing 40 has a suitable radial arm 41, as shown in Fig. 3, by which it may be rotatively shifted about the interrupter plate 32 to obtain spark advance, in a well known manner, and holding the casing in position is a spring arm 42 pivotally carried by a post 43 projecting laterally from the generator frame. A friction nut or clamp arrangement 44 serves to hold the arm in position, the upper end of the arm being formed with a seat or depression 45 which receives the central projection 46 on the front of the casing. At the top of the casing is mounted a block of insulation 47, carrying the collector brushes 25 which extend into the casing preferably at such angles as to conveniently position them at the top thereof. The brushes themselves are mounted in conductive sleeves 48 threaded into the block 47, which sleeves in turn carry the usual split terminals or spring posts 49. These posts are screw threaded into the sleeves so that, besides being detachable, they may form adjusting means for the springs 50 interposed between the brushes 25 and posts; the purpose of the springs being to urge the brushes against the collector ring.

It will be seen that the ignition contact mechanism and collector brushes may be readily removed intact with the casing from the generator frame when it is desired to inspect, adjust, repair or clean the apparatus, and may be replaced with the same facility without disturbing or deranging the parts. Such parts are also confined within a small compact space, a desideratum in autovehicle equipment in view of the limited space available. Furthermore such parts do not project or extend obtrusively so as to be liable to injury or derangement.

In Fig. 7 I show diagrammatically a modified form and arrangement which contemplates association of the primary alternating circuit leading from the collector brushes 25 with ignition apparatus of the vibrator coil type. The particular arrangement shown is of the master vibrator type or that form in which a single vibrator is employed for the several spark coils. The spark coils are indicated by the numeral 50 being in energizing relationship to the spark plugs 51. The primary circuit is connected to the circuit controller 52 through connection 53 and primary coil circuits 54 in a manner well known in the art. Intercalated in the primary circuit is the trembler or vibrator 56 and connected across the trembler contacts is the condenser 55. The secondary winding of the spark coils 50 may be grounded at 57 in circuit with the ground 58 of the spark plugs so that the plugs may be successively energized by the circuit controller or distributing mechanism 52 as will be described. The controller contact arm 59 is adapted to contact with a segment 60 and complete the primary circuit at the time the current wave approaches or reaches the maximum. The long sustained or broad peak of the current flow enables the trembler or vibrator to set up a spark cascade at the spark plug, of long duration and more efficacious than that obtainable with battery current. Furthermore the alternating character of the current has a regenerative action on or serves to retard excessive irregular oxidation of or tearing down of the vibrator contacts, which is so pronounced in battery ignition. As is well known the effect of the battery current, by reason of its unidirectional flow, is to peak and crater the opposing contact surfaces with the result that the make and break action is not clearly defined or decisive. The alternating current flow of my system produces a counter effect to this ragged deterioration so that there is always maintained clean flat opposing contact surfaces, subject only to normal wear, resulting in material preservation of the life of such contacts.

While I have indicated certain forms of construction and preferable circuit arrangement I do not desire to limit myself thereto. This will be especially apparent without necessity of specific illustration, in the case of the sparking or ignition apparatus indicated. Also, while I have described a light or work circuit associated with peculiar field regulating means, I do not desire to be restricted thereto.

The generator apparatus shown and described herein is not claimed in this application, as the same forms subject matter of a divisional application Serial No. 804,850, filed December 5, 1913.

Having thus described my invention, what I claim and desire to secure by Letters Patent is:

1. In electrical equipment of the character described, the combination with an internal combustion engine of an electric generator driven thereby in a non-variable phase relationship thereto and adapted to deliver continuous and alternating-current, a work circuit in continuous current association therewith, ignition apparatus having an energizing circuit in alternating current association therewith, and make and break mechanism for controlling said alternating current circuit, said make and break mechanism having its operative periods substantially coincidently related to the generator and engine phases, whereby the ignition apparatus shall be energized at determined periods of generation of the alternating current and in cyclic synchronism with the engine.

2. In electrical equipment of the character described, the combination with an internal combustion engine, of an electric generator having a revoluble armature driven thereby in a non-variable phase relationship thereto, a commutator, a work circuit in continuous current association with said commutator, slip rings, ignition apparatus having an energizing circuit in alternating current association with said slip rings, and controlling means for said alternating current circuit, said controlling means having its operative periods substantially coincidently related to the generator and engine phases, whereby the ignition apparatus shall be energized at determined periods of generation of the alternating current and in cyclic synchronism with the engine.

3. In electrical equipment of the character described, the combination with an internal combustion engine, of an electric generator driven thereby in a non-variable phase relationship thereto and adapted to deliver continuous and alternating current, a work circuit in continuous current association therewith, ignition apparatus having a circuit, and controlling means for bringing said circuit into and out of alternating current association with the generator at periods of time substantially coincidental with the maximum periods of flow of the alternating current wave and in synchronism with the engine cycles.

4. In electrical equipment of the character described, the combination with an internal combustion engine, of an electric generator driven thereby in a non-variable phase relationship thereto and adapted to deliver continuous and alternating current, a work circuit in continuous current association therewith, ignition apparatus having an energizing circuit in alternating current association therewith, and an interrupter driven in synchronism with the engine and adapted to interrupt the alternating current circuit at periods of time substantially coincident with the maximum periods of flow of the alternating current.

5. In electrical equipment of the character described, the combination with an internal combustion engine, of an electric generator driven thereby in a non-variable phase relationship thereto and adapted to deliver continuous and alternating current, a work circuit in continuous current association therewith, ignition apparatus having a primary energizing circuit in alternating current association, therewith, and an interrupter connected in said primary circuit and positively driven by the engine in synchronism with the engine and in such phase relationship to the generator as to interrupt the primary circuit at periods of time substantially coincident with the maximum periods of flow of the alternating current.

In testimony whereof, I have hereunto set my hand in the presence of two witnesses.

RICHARD VARLEY.

Witnesses:
M. A. KELLER,
MARY A. BARTH.

Copies of this patent may be obtained for five cents each, by addressing the "Commissioner of Patents, Washington, D. C."